July 26, 1938.  E. E. HEWITT  2,125,165
SAFETY CAR BRAKE EQUIPMENT
Filed Oct. 14, 1936  2 Sheets-Sheet 1

INVENTOR
ELLIS E. HEWITT
BY Wm. M. Cady
ATTORNEY

Patented July 26, 1938

2,125,165

UNITED STATES PATENT OFFICE 2,125,165

SAFETY CAR BRAKE EQUIPMENT

Ellis E. Hewitt, Edgewood, Pa., assignor to The Westinghouse Air Brake Company, Wilmerding, Pa., a corporation of Pennsylvania Application October 14, 1936, Serial No. 105,448

8 Claims. (Cl. 303—3)

This invention relates to safety car brake equipment, and particularly to safety car brake equipment of the character shown and described in my copending application Serial No. 26,394, filed June 13, 1935, and assigned to the assignee of the present application.

In the above copending application, there is disclosed a safety car brake equipment including a pair of deadman control devices functioning when both are simultaneously released to automatically cause a so-called "deadman's" emergency application of the brakes. Means is also provided in the copending application whereby a deadman's emergency application of the brakes is prevented or suppressed if, at the time that the deadman's control devices are released, at least a predetermined degree of service application of the brakes has been effected by the service application control device.

In the copending application, with the brake equipment operated to effect at least the predetermined degree of service application of the brakes to suppress a deadman's emergency application of the brakes, an emergency application of the brakes cannot be effected except by operation of a so-called conductor's valve device.

It is an object of my present invention to provide a safety car brake equipment having means whereby the operator may effect an emergency application of the brakes at any time, by operation of the same foot pedal element employed for effecting service applications of the brakes, notwithstanding that at the time a service application of the brakes is in effect or that a "deadman" emergency application of the brakes is being suppressed.

Another object of my invention is the provision, in a safety car brake equipment having a retardation controller device for automatically controlling the application and the release of the brakes so as to regulate the retardation of the vehicle or train to a certain substantially constant rate of retardation, of suitable means effective only for safety control or emergency applications of the brakes, upon the operation of the retardation controller to release fluid under pressure previously supplied to effect an application of the brakes, for limiting the reduction in the pressure effected by the retardation controller to a certain minimum pressure, thereby insuring the maintenance of an adequate braking force sufficient to bring the vehicle or train to a safe stop.

Another object of my invention is the provision, in a safety car brake equipment having apparatus for effecting an emergency application of the brakes, of means for insuring at least a certain predetermined degree of application of the brakes following the initiation of an emergency application of the brakes, adequate to safely stop the vehicle or train.

Another object of my invention is the provision, of a safety car brake equipment having the combination of an inertia operated retardation controller responsive to changes in speed of the car or train for so controlling the application and the release of all the separate brake units as to regulate the rate of retardation of the car or train to a substantially constant rate of retardation, and a separate automatically actuated means for each brake unit for separately controlling the release and reapplication of individual brakes or brake units so as to prevent sliding of the associated wheel or wheels.

A further object of my invention is the provision, in a safety car brake equipment including a self-lapping valve device manually operable to effect service applications of the brakes and other apparatus controlled by "deadman" devices for effecting emergency applications of the brakes, of suitable means whereby to lock the self-lapping valve device in application position to permit the complete release of all "deadman" devices and brake operating means without effecting a "deadman" emergency application of the brakes and without effecting a release of the brakes.

The above objects, and other objects of my invention which will be made apparent subsequently, are attained by means of an illustrative embodiment of a safety car brake equipment described hereinafter as shown in the accompanying drawings, wherein, Fig. 1 and Fig. 2 taken together constitute a diagrammatic view of the essential elements comprising a safety car brake equipment embodying the features of my invention, Fig. 3 is a sectional view, taken on line 3—3 of Fig. 1, showing details of construction of the anti-wheel-sliding device.

Fig. 4 is a sectional view, taken on the line 4—4 of Fig. 1, showing the construction of the anti-wheel-sliding device in further detail, Fig. 5 is a fragmentary sectional view, taken on the line 5—5 of Fig. 2, showing in further detail the construction of an electric controller device for controlling the application of the magnetic track shoe brakes.

*Brief description of equipment*

Figures 1, 3, 4:
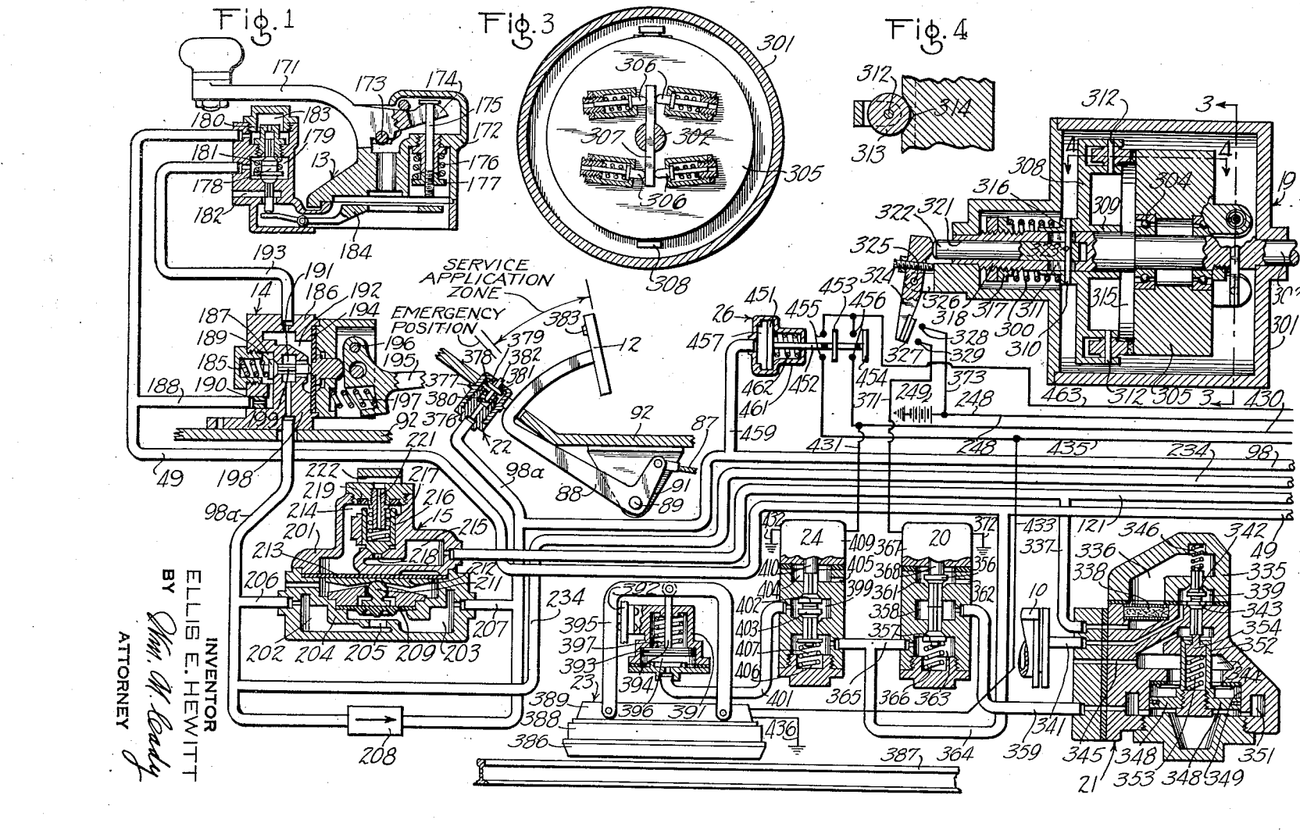
Figures 2, 5:
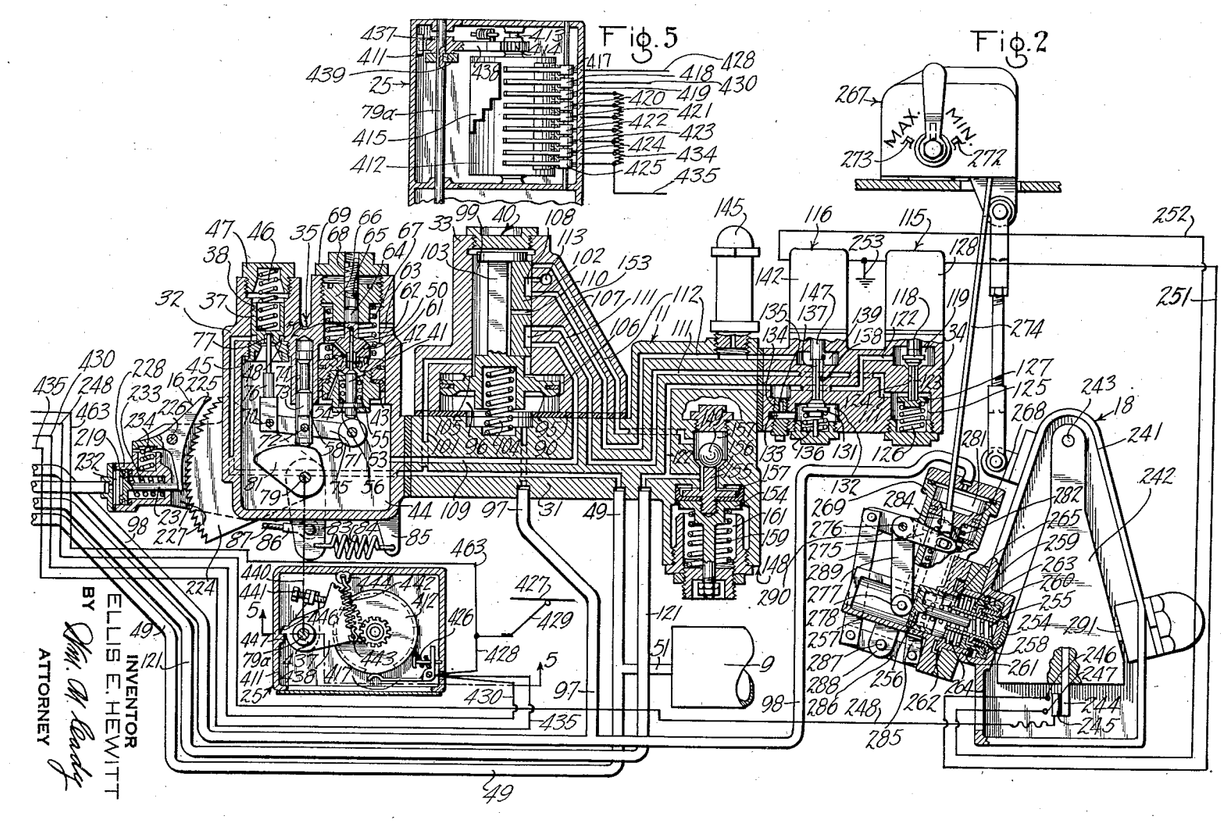

Briefly, the equipment, shown in Figs. 1 and 2, comprises a fluid pressure brake system exemplified by a brake cylinder 10, a control valve mechanism 11 for controlling the supply and release of fluid under pressure to and from the brake cylinder 10, a brake pedal 12 operative over an application zone to so operate the control valve mechanism 11 as to cause a service application of the brakes by straight-air operation, and deadman control devices in the form of a controller valve device 13 and a foot-valve device 14 functioning jointly and cooperatively to so control the operation of the control valve mechanism 11 as to cause a deadman emergency application of the brakes. A cut-out valve device 15 is provided which is effective when at least a certain uniform brake cylinder pressure is obtained to render the deadman control devices 13 and 14 ineffective to cause a deadman emergency application of the brakes. A locking mechanism 16 associated with the control valve mechanism 11 is operative, upon the simultaneous release of both of the deadman control devices 13 and 14, to prevent operation of the control valve mechanism 11 to reduce brake cylinder pressure, thereby enabling the complete removal of the operator's foot from the brake pedal 12 and causing the cut-off valve device 16 to remain effective to suppress or prevent a deadman emergency application of the brakes.

According to my invention a vent valve device 22 is provided which is effective to cause operation of the control valve mechanism 11 resulting in an emergency application of the brakes, the vent valve device being operated only when the brake pedal 12 is fully depressed that is, through and beyond the service application zone.

Also functioning as a part of the fluid pressure brake system is a retardation controller device 18 which operates on the control valve mechanism 11 to so control the brake cylinder pressure as to maintain a substantially constant selected rate of retardation. Also included in the fluid pressure brake system is an anti-wheel-sliding device 19 which is effective, through a magnet valve device 20 and a control valve device 21, to effect release of fluid under pressure from the brake cylinder 10.

The equipment shown further comprises a magnetic track brake system including a magnetic track shoe brake device 23, and a magnet valve device 24 for controlling the raising and lowering of the track shoe brake device 23. An electric controller device 25 is operated by the brake pedal 12 for controlling the degree of energization of the electro-magnet on the magnetic track shoe device 23 as well as the operation of the raising and lowering magnet valve device 24 for service applications of the brakes. A pneumatic switch device 26 functions in emergency applications of the brakes, independently of controller 25, for effecting application of the magnetic track shoe brakes to the maximum degree.

*Detailed description of equipment*

Before considering the equipment in detail, it should be understood that the brake cylinder 10 is illustrative of a plurality of brake cylinders which are provided, one for each wheel or axle or for a plurality of wheels or axles, and that an anti-wheel-sliding device similar to the device 19, a magnet valve device similar to the magnet valve device 20, and a control valve device similar to the control valve device 21 is provided for each brake cylinder. In a similar manner, it will be understood that in practice a plurality of magnetic track shoe devices similar to the magnetic track shoe device 23 will be provided which are controlled and operated in a manner similar to that of the magnetic track shoe device 23.

Referring first to Fig. 2, the control valve mechanism 11 comprises a casing having a pipe bracket section 31 to which are suitably secured in sealed relation by suitable bolts or screws, not shown, a self-lapping valve section 32, an emergency valve section 33, and a magnet valve section 34.

Embodied in the casing section 32 is a self-lapping valve device 35 comprising a supply valve 37 in the form of a valve piston which operates slidably in a bore 38 in the casing section 32, and a release valve 41 which is carried on a piston or movable abutment 42 that operates in a bore 43 in the casing section 32. The bore 43 opens at the inner end thereof into a chamber 44, hereinafter termed the pressure chamber, and opens at the outer end thereof to the exterior of the casing. The supply valve 37 is yieldingly urged into seated relation on a valve seat, formed on a bushing 45 secured to the casing section 32, by a spring 46 which is interposed between the valve 37 and a screw-threaded nut 47 turned into the outer threaded portion of bore 38. The supply valve 37 is effective, when unseated against the force of the spring 46, to open communication between the pressure chamber 44 and a chamber 48, which is constantly connected to the main reservoir 9 through a passage and pipe 49 and a branch pipe 51.

The release valve 41 is in the form of a pin valve having a reduced portion or stem 50 at one end which operates slidably in a longitudinally extending bore 52 at the central axis of the piston 42, the opposite end of the release valve extending into the pressure chamber 44 and having a collar or flange 53 which is guided in a recess 54 in the piston 42 open to the pressure chamber. The release valve 41 is normally yieldingly unseated from a cooperating valve seat on the piston 42 by a spring 55 which surrounds the valve 41 in the recess 54 and which is disposed between the inner end of the recess 54 and the flange 53. A washer or collar 56, removably secured to the inner face of the piston 42, has a central perforation through which the inner end of the pin valve 41 extends into the chamber 44 and serves as a stop for the flange 53 on the pin valve 41 to limit the unseating movement of the valve 41 with respect to its valve seat. The release valve 41 is disposed in a chamber 57 in the piston 42, which is constantly connected to the pressure chamber 44 through a passage 58, and controls communication from the chamber 57 through a central bore 59 in the piston and one or more branch passages 61 to a chamber 62 at the opposite side of the piston 42 which is constantly open to atmosphere through a port 63.

The piston 42 has a central stem 64 which operates slidably in a bore 65 formed centrally in a screw 66 screwed into the outer threaded portion of the bore 43. Disposed in the chamber 62 between the screw 66 and the face of the piston 42 is a spring 67 which serves to yieldingly urge the piston 42 inwardly of the bore 43 toward the pressure chamber 44. The tension of the spring 67 may be adjusted by turning the screw 66 inwardly or outwardly of the bore 43.

The outer end of the central bore 65 in the screw 66 is threaded to receive a set screw 68 which is engageable by the stem 64 on the piston 42 and serves as a stop for the outward movement of the piston in the bore 43. A lock nut 69 is screwed over the set screw 68 and into contact with the casing section 32 to lock the set screw 68 in position.

Operation of the supply valve 37 and the release valve 41 is effected by means of a floating lever 71 which is pivoted intermediate the ends thereof, as by a pin 72, on a plunger 73 that operates slidably in a bore 74 in the casing, the bore 74 being between the bores 38 and 43 and in substantially parallel relation thereto. Carried at one end of the lever 71 is a roller 75, which is adapted to engage the inner end of the release valve 41, and pivoted as by a pin 70 at the opposite end of the lever 71 is an operating rod 76 which is adapted to extend into a recess 77 formed in the face of the supply valve 37.

A shaft 79 is suitably journaled to the casing section 32 in a manner not shown and extends through the pressure chamber 44 substantially at right angles to the line of movement of the plunger 73 and carries a cam 81 thereon which is securely fixed thereto and adapted to engage the inner end of the plunger 73 to urge the plunger 73 upwardly in the bore 74 upon a clockwise rotation of the shaft 79, as viewed in Fig. 2.

Secured to the shaft 79 at a portion thereof exterior to the casing section 32 is an operating arm 83, and a spring 84 is secured at one end to the outer end of the arm 83 and at the opposite end to a lug 85 on the casing section 32 to yieldingly bias the arm 83 and the shaft 79 in a counterclockwise direction into the normal position thereof as shown.

Pivotally connected to the lever arm 83 at a suitable point thereon, as by an eyelet or clevis 86, is a flexible cable or a rigid tie rod 87, the opposite end of which is connected to the outer end of one arm of a bell-crank lever 88. (Fig. 1.) The bell-crank lever 88 is pivotally mounted, as by a pin 89, on a bracket 91 attached to the floor 92 of the car of the vehicle and the brake pedal 12 is secured to or formed integrally with the bell-crank lever 88 in such manner that the application of pressure to the brake pedal 12 applies force to the outer end of the other arm of the bell-crank lever 88. Thus, when the brake pedal 12 is depressed toward the floor 92, the bell-crank lever 88 is rotated on the pin 89 in a counterclockwise direction, as viewed in Fig. 1, and the consequent pull exerted on the cable or rod 87 overcomes the spring 84 and causes rotation of the lever arm 83 and the shaft 79 in a clockwise direction, as viewed in Fig. 2.

The spring 46 acting on the supply valve 37 is more strongly tensioned than the spring 55 acting on the release valve 41, and thus initial rotation of the cam 81 in a clockwise direction to shift the plunger 73 upwardly in the bore 74 causes the lever 71 to pivot on the pin 70 in a counterclockwise direction to overcome the force of the spring 55 and seat the release valve 41 to close communication between the pressure chamber 44, at one side of the piston 42 and the atmospheric chamber 62 at the opposite side of the piston 42. The spring 67 acting on the piston 42 is stronger in tension than the spring 46 acting on a supply valve 37 and consequently, after the release valve 41 is seated, the continued rotation of the cam 81 in a clockwise direction causes the lever 71 to pivot on the roller 75 in a clockwise direction to unseat the supply valve 37 against the force of the spring 46. Fluid under pressure is accordingly supplied from the main reservoir 9 to the pressure chamber 44.

As the pressure of the fluid supplied to the chamber 44 increases, the spring 67 is overcome by the fluid pressure in chamber 44 acting on the piston 42 and the piston is thus moved outwardly of the bore 43. The spring 46 acting on the supply valve 37 thus becomes effective through the supply valve 37 and the operating rod 76 to rock the lever 71 about the pin 72 in a counterclockwise direction until the supply valve 37 is seated, while at the same time maintaining the release valve 41 seated.

Upon further rotation of the cam 81 in a clockwise direction, the supply valve 37 is again unseated to again supply fluid under pressure from the main reservoir 9 to the pressure chamber 44 and when the pressure in the chamber 44 increases sufficiently, depending upon the position of the cam 81, to overcome the spring 67, the spring 46 again becomes effective to reseat the supply valve 37 and cut off the further supply of fluid under pressure to the pressure chamber 44.

When the pressure in the pressure chamber 44 has increased sufficiently so that the stem 64 of the piston 42 engages the set screw 68, the spring 46 is ineffective to return the supply valve 37 to seated position because the outward movement of piston 42 necessary to permit rocking of the lever 71 in a counterclockwise direction on the pin 72 is prevented. Accordingly the supply valve 37 remains open and fluid under pressure continues to be supplied from the main reservoir 9 into the pressure chamber 44 to cause a maximum pressure, corresponding to the pressure of the main reservoir 9, to be produced in the chamber 44.

When the pressure on the foot pedal 12 is relieved, the spring 84 becomes effective to return the lever arm 83, the shaft 79, and the cam 81 in a reverse or counterclockwise direction. Assuming that a certain pressure has been established in the pressure chamber 44 and that both the supply valve 37 and the release valve 41 are seated, the return of the cam 81 in a counterclockwise direction renders the spring 55 acting on the release valve 41 effective to unseat the release valve to thereby establish communication through which the fluid under pressure in the chamber 44 is exhausted to atmosphere by way of the passage 58, chamber 57, bore 59, passages 61, chamber 62 and port 63. As the pressure in the pressure chamber 44 diminishes, the spring 67 becomes effective to shift the piston 42 inwardly of the bore 43, that is, toward the pressure chamber 44, and assuming that the cam 81 is held in position, ultimately shifts the piston 42 to reseat the pin valve 41 on its valve seat to close off the exhaust of fluid under pressure from the pressure chamber 44. When the cam 81 is returned a further extent toward its normal position, the further release of fluid under pressure from the pressure chamber 44 is effected in a similar manner. It will be apparent that the supply valve 37 remains seated to cut off the supply of fluid under pressure from the main reservoir 9 to the pressure chamber 44 as the cam 81 is returned toward its normal position in a counterclockwise direction because movement of the piston 42 inwardly of the bore 43, as the pressure in the pressure chamber 44 reduces, is stopped the instant that the release valve 41 is reseated, and thus the lever 71 is not rocked or pivoted in a clockwise direction on the pin 72 to unseat the valve 37.

When the cam 81 is returned fully to its normal or release position, the spring 67 is ineffective to cause reseating of the release valve 41 and consequently the exhaust communication for the pressure chamber 44 through the atmospheric port 63 remains open.

The emergency valve casing section 33 contains an emergency valve device 40 comprising a piston 95 which has at one side thereof a piston chamber 96 constantly connected by a branch pipe 97 to a pipe 98, hereinafter termed the safety control pipe, and having at the other side thereof a valve chamber 99 which is constantly charged with fluid under pressure from the main reservoir 9 through a passage 101 connecting the chamber 99 with the main reservoir passage and pipe 49. Contained in the valve chamber 99 is a slide valve 102 which is secured between the end flange on a stem 103 of the piston 95 and a shoulder on the piston and shifted on a cooperating valve seat according to the movement of the piston 95. Interposed in the piston chamber 96 between the piston 95 and the casing is a spring 104 which yieldingly biases the piston 95 into the position shown, that is in contact with a stop shoulder 105 wherein a feed or leakage groove 106 is opened around the piston connecting the valve chamber 99 and the piston chamber 96 for equalizing the pressures therein.

The slide valve 102 is provided with a pair of cavities 107 and 108, and a port 110. In the normal position of the slide valve 102 shown, the cavity 107 establishes communication between a passage 109, leading to and opening into the pressure chamber 44 of the self-lapping valve device 35, and a passage 111, and the cavity 108 establishes communication between a passage 112 and an atmospheric exhaust port and passage 113.

Upon a reduction in the safety control pipe pressure and thus in the pressure in piston chamber 96, the higher pressure in slide valve chamber 99 shifts the piston 95 to application position in sealing contact with a gasket seat 90, the piston closing the feed groove 106 in its traverse to application position. In the application position of the piston 95, the slide valve 102 is correspondingly positioned in application position so that port 110 registers with passage 111 and the end of the slide valve uncovers a passage 153 opening at the seat of the slide valve. In application position, the slide valve 102 laps or closes the ports and passages 109 and 112, and the exhaust port 113.

The magnet valve casing section 34 has embodied therein a supply magnet valve device 115 and a release magnet valve device 116. The supply magnet valve device 115 comprises a supply valve 118 which is contained in a chamber 119 that is constantly connected by a passage 122 to a passage and a pipe 121, hereinafter termed the straight-air pipe. The supply valve 118 has a fluted stem 123 that extends through a bore 124 into a chamber 125 into which opens the passage 111, leading from the seat of the slide valve 102 of the emergency valve device. A spring 126, contained in chamber 125 and acting on the end of the fluted stem 123 through the medium of a collar or flange 127, normally yieldingly urges the supply valve 118 into unseated position to open communication between the chamber 119 and the chamber 125. An electromagnet 128 is effective, when energized, to actuate the supply valve 118 into seated position against the force of the spring 126.

The release magnet valve device comprises a release valve 131 which is contained in a chamber 132 constantly connected to the passage 122 through a passage 133 and a choke 134 having a restricted passage 135. A biasing spring 136 disposed in the chamber 132 and interposed between the release valve 131 and the casing section 34 normally yieldingly urges the release valve 131 into seated position on a cooperating valve seat. The release valve 131 has a fluted stem 137 that extends through a bore 138 in the casing into a chamber 139, into which opens the passage 112 leading from the seat of the slide valve 102 of the emergency valve device. An electromagnet 142 is effective, when energized, to actuate a plunger 141 to engage the end of the stem 137 and thereby to shift the release valve 131 away from its valve seat to establish communication from the chamber 132 to the chamber 139.

According to my invention, I provide a safety valve device 145 of well known construction, suitably mounted on the pipe bracket casing section 31 and subject to the fluid pressure in the passage 112. When the exhaust communication of the passage 112 to the exhaust port 113, normally established by the cavity 108 in the slide valve 102 of the emergency valve device 40 is cut off in the manner hereinafter described, the safety valve device 145 is effective to release fluid under pressure from the passage 112 only as long as the pressure of the fluid exceeds a certain predetermined pressure, the particular pressure being variable according to the adjustment or tension of the loading spring (not shown) of the safety valve device 145.

Embodied in pipe bracket section 31 is an inshot valve device 148 which comprises a ball valve 149 contained in a chamber 151 that is connected to the seat of the slide valve 102 of the emergency valve device by the passage 153, the passage 153 being lapped at the seat of the slide valve 102 for the normal position of the slide valve as shown. The inshot valve device 148 further comprises a piston 154 having an upstanding stem 155 which extends through a passage 156 connecting the chamber 151 and a chamber 157 at one side of the piston 154, the piston 154 being normally yieldingly urged upwardly by a spring 159, which is contained in a chamber 161 at the opposite side of the piston 154, for causing the stem 155 to engage and unseat the ball valve 149. The straight-air pipe and passage 121 opens into the passage 156 and when the ball valve 149 is unseated, communication is established therepast from the passage 153 to the straight-air pipe 121, this communication being closed when ball valve 149 is seated. Seating of the ball valve 149 is accomplished when the pressure of the fluid supplied into the straight-air pipe 121 and effective in the passage 156 and chamber 157 on the piston 154 overcomes the pressure of the spring 159 and causes downward shifting of the piston 154.

Referring now to Fig. 1, the controller valve device 13, which is of well known construction, comprises a removable operating handle 171 which is effective upon rotation in a horizontal plane to effect operative movement of a controller drum for controlling the electrical connections to and the speed of the propelling motors of the vehicle or car, in manner not shown, but well understood. The operating handle or lever 171, when inserted in the casing 172, pivots on a pin 173 and the inner bifurcated end 174 thereof straddles a stem 175. When the outer end of the operating handle 171 is depressed, the inner end 174 engages a flange or head at the upper end of the stem 175 and raises the stem 175 against the opposition of a spring 176 interposed between the casing 172 and a nut 177 screwed on the lower threaded end of the stem 175. With the stem 175 raised into the position shown, a double beat valve 178, contained in a chamber 179 in the casing 172, is actuated by a spring 181 into seated relation on a lower valve seat formed on the casing to close communication between the chamber 179 and an exhaust port and passage 182, and at the same time to open communication past the upper valve seat between chamber 179 and a chamber 183 to which is connected main reservoir pipe 49. A choke 180, screwed to the casing restricts the flow of fluid from chamber 183 to chamber 179 for a purpose hereinafter made apparent.

When the hand of the operator is removed from the outer end of handle 171 or the downward pressure thereon is relieved, spring 176 actuates stem 175 downwardly to rock a pivoted lever 184 in a clockwise direction to shift the double beat valve 178 away from its lower seat and into seated relation on its upper seat, thereby opening the communication from chamber 179 to atmospheric passage 182 and closing the communication between chambers 183 and 179.

The foot-valve device 14 comprises a suitable casing 186 which is secured to the floor 92 of the vehicle and which has formed therein a chamber 187, constantly connected to the main reservoir pipe 49 through a branch passage and pipe 188 having a choke 190 therein. The chamber 187 contains a valve 189 of the poppet type which is yieldingly urged by a spring 190, also contained in the chamber 187, into seated relation on an associated valve seat to close communication between the chamber 187 and a chamber 191 to which is connected a pipe and passage 98a. Also formed in the casing 186 is a chamber 192 which is constantly connected to the chamber 179 of the controller valve device 13 by a pipe 193, communication between the chamber 192 and the chamber 191 being controlled by a diaphragm valve 194. Operation of the valve 189 and the diaphragm valve 194 is effected by means of a foot pedal 195 which is pivoted on the casing 186 by a pin 196 and which is normally biased to a raised position by a spring 197 interposed between the casing 186 and the lever 195. When the foot pedal 195 is depressed against the force of the spring 197, it causes shifting of the diaphragm valve 194 into seated relation on an annular rib seat 198 to close the connection between the chambers 191 and 192. The diaphragm valve 194, in being shifted to seated position, engages the inner end of the fluted stem 199 of the valve 189 and unseats the valve 189 against the force of the spring 191. Upon the release of the foot pedal 195, the spring 197 shifts it upwardly, and the spring 191 then becomes effective to reseat the valve 189, and through the stem 199 of the valve 189, to unseat the valve 194.

The cut-off valve device 15 comprises a casing 201 having a chamber 202 and a chamber 203 separated by a wall 204 having a port 205 therein. The chamber 202 is connected to the pipe 98a at one point by a branch pipe 206 and chamber 203 is also connected to the pipe 98a at another point by a branch pipe 207, the section of the pipe 98a between the branch pipes 206 and 207 having a one-way or non-return valve 208 connected therein for preventing the flow of fluid under pressure through the pipe 98a except in a direction indicated by the arrow.

The cut-off valve device 15 further comprises a diaphragm valve 209 which is normally unseated from the wall 204 to open the port 205 and thus establish connection between the chambers 202 and 203. On the upper face of the diaphragm valve 209 is a follower 211 which is engaged by a follower 212 on the lower face of a diaphragm 213 which is subject on the upper face thereof to the pressure of fluid in a chamber 214 at the upper side of the diaphragm. Formed in the casing 201 is a chamber 215 to which the straight-air pipe 121 is connected, communication between the chambers 215 and chamber 214 through a port 218 being controlled by a valve in the form of a piston valve 216 which is normally yieldingly urged into seated relation on an associated valve seat by a biasing or loading spring 217 to close port 218.

When the pressure supplied to the straight-air pipe 121 and thus to the chamber 215 exceeds a certain uniform pressure sufficient to overcome the spring 217, valve 216 is unseated from its valve seat and shifted upwardly to contact with an annular gasket seat 219 to close the connection from chamber 214 to atmosphere through a passage 221 and port 222. Fluid under pressure supplied from the chamber 215 to the chamber 214 acts on the upper face of the diaphragm 213 which in turn urges the diaphragm valve 209 downwardly into seated engagement with the wall 204 to close the port or passage 205. It will thus be understood that the valve 209 is not actuated to close the port 205 unless and until the pressure in the straight-air pipe 121 and, as will be seen later, also in the brake cylinder 10, exceeds a certain uniform pressure.

When the pressure in the straight-air pipe 121 and chambers 215 and 214 reduces below a value sufficient to overcome the spring 217, the spring becomes effective to shift the valve 216 back to seated position on its associated valve seat, closing the port 218 and opening the exhaust connection for the chamber 214. When the pressure in the chamber 214 is thus reduced to atmospheric pressure, the diaphragm 213 returns upwardly and relieves the pressure on the diaphragm valve 209 which accordingly inherently returns to its normal unseated position to open the port 205.

Referring again to Fig. 2, the locking device 16 of the self-lapping valve device 35 comprises a toothed segment 224, which is keyed or otherwise suitably secured to the shaft 79 of the self-lapping valve device 35, and a pawl 225 which is pivotally mounted by a pin 226 on an extension 227 of the casing section 32.

Formed on or attached to the extension 227 is a pressure cylinder 228 containing a piston 229 which is provided with a stem 231 for engaging and rocking the pawl 225 out of engagement with the toothed portion of the segment 224 when fluid under pressure is supplied to a chamber 232 at one side of the piston 229. At the opposite side of the piston 229 is a spring 233 which yieldingly opposes the movement of the piston by the pressure of fluid in the chamber 232. Fluid under pressure is supplied to chamber 232 through a pipe 234, hereinafter called the lock pipe, which is connected to the pipe 98a at a suitable point between the non-return valve 208 and the foot-valve device 14. When the pressure in the chamber 232 is reduced sufficiently, the spring 233 shifts the piston 229 and its stem 231 in the left-hand direction and another spring 234 which is interposed between extension 227 and the pawl 225 becomes effective to shift the pawl 225 into interlocking engagement with the toothed surface of the segment 224.

The teeth of the toothed surface of the segment 224 are so disposed and so constituted that the pawl 225 is effective to hold the segment 224 and consequently the shaft 79 against only counter-clockwise rotation, that is, movement toward the normal or release position by the spring 84. Rotation of the segment 224 and shaft 79 in a clockwise direction, that is, movement corresponding to depression of the brake pedal 12 into the service application zone, is not prevented.

The retardation controller device 18 shown in Fig. 2 is described in detail and claimed in the copending application Serial No. 971, of Clyde C. Farmer, filed January 9, 1935, and assigned to the assignee of the present application and it will accordingly be but briefly described herein. The retardation controller device 18 comprises a suitable casing 241 containing an inertia body 242 in the form of a weighted pendulum pivotally suspended on a pin 243 attached to the casing 241. Suitably secured to the lower end of the inertia body 242 is an extension piece 244 which carries, in insulated relation thereon, a contact member 245 which is adapted to engage in succession a pair of stationary insulated contact fingers 246 and 247 which are mounted on the casing 241.

The contact member 245 is connected by a wire 248 to one terminal of a battery 249, shown in Fig. 1, the other terminal of which is grounded. The contact finger 246 is connected by a wire 251 to one terminal of the electromagnet 128 of the supply magnet valve device 115 and the contact finger 247 is connected by a wire 252 to one terminal of the electromagnet 142 of the release magnet valve device 116. The remaining terminals of the electromagnets 128 and 148 are connected to the grounded terminal of the battery 249 as by connection to ground at 253.

The retardation controller device 18 is so mounted on the vehicle or train of cars that when the brakes are applied on the vehicle or cars the inertia body 242 swings in the left hand direction against a stop plunger 254. Movement of the stop 254 is yieldingly resisted by a coil spring 255 which is interposed between the stop 254 and one face of a piston 256 which operates in a cylinder 257. The stop plunger 254 has a flange 258 thereon which is adapted to engage a flange 259 on a piston 260 which operates in the bore 261 of a bushing 262 which is screwed into a threaded opening 263 in the casing 241. A coil spring 264 is interposed between a flange 265 on the bushing 262 and the piston 260 and yieldingly opposes movement of the piston 260 when the flange 258 on the stop plunger 254 engages the flange 259 on the piston 260.

It will thus be seen that the swing of the inertia body 242 in the left-hand direction is accordingly first resisted by the spring 255 alone and then by both the spring 255 and the spring 264. The arrangement of the springs 255 and 264 is such that when the inertia force acting on the inertia body 242 is sufficient to overcome only the spring 255, it causes engagement of the contact member 245 only with the contact finger 246, and when the inertia force is sufficient to overcome the combined strength of the springs 255 and 264, the inertia body 242 is moved sufficiently in the left-hand direction to cause the contact member 245 to engage both the contact finger 246 and the contact finger 247. The operation of the retardation controller device 18 in controlling the magnet valve devices 115 and 116 of the control valve mechanism 11 will be described in detail hereinafter.

In order to vary the rate of retardation to be produced on the vehicle or cars as determined by the retardation controller 18, provision is made for increasing the tension of the spring 255 either manually, by means of a manually operable adjusting device 267, or automatically, by means of a fluid pressure responsive device in the form of a piston 268, which is contained in a pressure cylinder 269 suitably mounted or attached to the casing 241 of the retardation controller.

The manually operable adjusting device 267 comprises an operating handle 271 which is movable between two opposite positions defined by stop members 272 and 273 and designated "minimum" and "maximum" positions, respectively. Movement of the operating handle 271 is effective through an operating rod 274 to rotate an operating arm 275 rotatively mounted on a shaft or pin 276 attached to the casing. The hub portion of arm 275 is interlocked with the hub portion of another arm 277 which is also rotatively mounted on shaft 276 and which has a roller 278 at the extremity thereof that engages the outer face of the piston 256. When the operating handle 271 is in the "minimum" position in contact with the stop 272, the arm 277 is shifted in a direction away from the piston 256 and thus the spring 255 may expand correspondingly so that a minimum tension is placed thereon. When the operating handle 271 is shifted away from the stop 272 toward the stop 273 the lever arm 277 is moved so as to shift the piston 256 and to compress and increase the tension in the spring 255. When the handle 271 is against the stop 273 corresponding to the "maximum" position, the spring 255 is under maximum tension.

The piston 268 is normally subject to the pressure of fluid supplied through the safety control pipe 98 to a chamber 281 at one side of the piston, which pressure overcomes the force of a coil spring 282 at the opposite side of the piston 268. When the pressure in the safety control pipe 98 and thus in the chamber 281 is reduced sufficiently, the spring 282 becomes effective to shift the piston 268 outwardly. The piston 268 has a stem 284 which is connected through a link 285 to a lever 286 pivoted intermediate the end thereof by a pin 287 on a lug 288 attached to or formed on the pressure cylinder 257. The opposite end of the lever 286 is connected by a link 289 to the outer end of an operating arm 290 which is rotatively mounted on the shaft 276. The hub of the arm 290 is interlocked with the hub of the arm 277 in such manner as to cause rotation of the arm 277 to increase the tension of the spring 255. When the piston 268 is shifted outwardly by the reduction of the pressure of the fluid in the chamber 281 and in the safety control pipe 98, the lever 286 is rocked in a counter-clockwise direction to cause movement of the lever arm 277 to increase the tension of the spring 255 to the fullest extent corresponding to that produced when the operating handle 271 of the manually operable adjusting device 267 is in the maximum position against the stop 273.

The hub portions of the operating arms 275, 277 and 290 are so constructed and interlockingly arranged that movement of the operating handle 271 of the manual adjusting device 267 is ineffective to cause movement of the piston 268, and that shifting of the piston 268 is ineffective to shift the position of the operating handle 271.

A spring biased stop 291 disposed at the opposite side of the inertia body 242 to the stop plunger 254 serves to limit the movement of the inertia body 242 in the right hand direction and also to normally hold the inertia body 242 against undesirable movement and vibration resulting in undesired engagement of the contact member 245 with the contact members 246 and 247.

Referring now to Fig. 1, the anti-wheel sliding device 19, shown in Fig. 1, is substantially the same as that shown, described and claimed in the copending application Serial No. 713,103 of Rankin J. Bush, filed February 27, 1934, and assigned to the assignee of the present application and will therefore be described only generally herein. The device 19 comprises a suitable casing 301 having a shaft 302 supported for rotation at opposite ends thereof in suitable journals in the casing 301, the shaft 302 being driven in any suitable manner, as through connecting gears, according to the speed of rotation of a wheel or an axle of the vehicle or car.

Mounted on the shaft 302, as by suitable ball or roller bearings 304, is an inertia body 305 in the form of a fly-wheel. The inertia body 305 is resiliently connected to the shaft 302 and driven thereby through the medium of four spring pressed plungers or stops 306 carried on and attached to the inertia body, two of which are on one side and two of which are on the opposite side of a rod 307 secured to the shaft 302 and extending at right angles to the longitudinal axis of the shaft 302.

Also mounted on the shaft 302 in axially displaced relation to the inertia body 305 is a wheel or disc 308 having a hub 309. A pin 310, extending transversely through the hub 309 of the wheel 308 and through a transverse slot 311 in the shaft 302, secures the wheel 308 to the shaft 302 for rotation therewith.

Mounted in suitable recesses at the periphery of the wheel 308 on pins 312 are a plurality of rollers 313 which are adapted to engage in V-shaped recesses 314 that are formed in an annular rib 315 at one end of the inertia body 305. A coil spring 300, interposed between a shoulder 316 on the hub 309 of the wheel 308 and a suitable adjusting nut 317 screwed over a threaded portion 318 on the shaft 302, yieldingly urges the wheel 308 in the direction of the inertia body 305 and tends to maintain the rollers 313 engaged in the recesses 314 on the inertia body 305.

Slidably mounted in a longitudinal bore 321 opening at the free end of the shaft 302 is a plunger rod 322, the inner end of which has a transverse hole 323 through which the pin 310 extends. It will thus be apparent that the plunger 322 and the wheel 308 move together.

A switch arm or lever 324 is pivotally mounted intermediate the ends thereof on a pin 325 attached to a lug 326 on the casing 301 and is rocked on the pin 325 by shifting of the plunger 322 outwardly of the bore 321. The switch arm 324 has a contact bridging member 327 mounted in insulated relation thereon for connecting a pair of stationary insulated contact fingers 328 and 329 when the plunger 322 moves outwardly of the bore 321 to rock the switch arm 324 in a counterclockwise direction.

When the brakes are applied on the axle from which the shaft 302 is driven, the inertia of the inertia body 305 overcomes the force of the spring biased stops 306 and moves relatively to the shaft 302. Due to the fact that the wheel 308 moves at the same speed as the shaft 302, the sloping side surfaces of recesses 314 on the inertia body 305 act as cams to force the wheel 308 axially along the shaft 302 in opposition to the tension of the spring 300. The plunger 322 is accordingly correspondingly shifted outwardly of bore 321 so as to rock the switch arm 324 towards the contact fingers 328 and 329. If the movement of the inertia body 305 relative to the shaft 302 is sufficient, as when the axle and associated wheels start to slip or reduce rapidly to zero speed, the rollers 313 ride up out of the recesses 314 to the outer face of the annular rib 315. Sufficient shifting of the wheel 308 and the plunger 322 is thus produced to cause the switch arm 324 to bridge the contact members 328 and 329 in circuit-closing relation.

When the shaft 302 and wheel 308 over-speed the fly-wheel inertia body 305, as when the train wheels accelerate back toward a rotative speed corresponding to the speed of the train following slipping thereof, the relative movement between the wheel 308 and body 305 also results in engagement of the switch arm with the contact members 328 and 329 in circuit-closing relation.

The control valve device 21 comprises a casing 335 having a chamber 336 which is connected to the straight-air pipe 121 through a branch pipe and passage 337, an air-strainer device 338 being interposed between the passage 337 and the chamber 336. Also formed in the casing 335 is a chamber 339 which is constantly connected to the brake cylinder 10 through a pipe and passage 341. The chamber 339 contains a pair of oppositely seating valves 342 and 343, the valve 342 being effective to control communication between the chamber 336 and the chamber 339 and the valve 343 being effective to control the communication between the chamber 339 and a chamber 344 which is constantly open to the atmosphere through a port 345. A spring 346 acting on the valve 342 normally yieldingly urges the valves 342 and 343 into unseated and seated positions respectively to open the communication between the chamber 336 and the chamber 339 connected to the brake cylinder 10 and to close the communication between the chamber 339 and the atmospheric chamber 344.

A piston 348 operates in a bore 349 in the casing, the piston being subject to the pressure in the atmospheric chamber 344 on one side thereof and to the pressure in a chamber 351 at the other side thereof. The piston is provided with a stem 352 having a bore 353 therein containing a spring biased stop 354 which is adapted to engage the fluted stem of the valve 343.

When fluid under pressure is supplied to the chamber 351, the piston 348 is urged upwardly to unseat the valve 343 and to seat the valve 342, communication between the chamber 336 and the chamber 339 connected to the brake cylinder 10 being thus cut off or closed and communication between the chamber 339 and the atmospheric chambers 334 being opened.

The magnet valve device 20 controls the supply and the release of fluid under pressure to and from the chamber 351 of the control valve device 21. The magnet valve device 20 comprises a pair of oppositely seating valves 356 and 357, the valves having fluted stems which meet in endto-end contact in a chamber 358 which is constantly connected to the chamber 351 of the control valve device 21 by a pipe and passage 359. The valve 356 is contained in a chamber 361 which is constantly open to atmosphere through a port 362, and the valve 357 is contained in a chamber 363 which is constantly connected to the main reservoir pipe 49 by a branch pipe 364 and another branch pipe 365. A coil spring 366 contained in chamber 363 and acting on the valve 357 normally urges the valves 356 and 357 into seated and unseated positions, respectively, the valve 356 establishing communication from the chamber 358 to the atmospheric chamber 361 and the valve 357 closing communication between the chamber 358 and the chamber 363. An electromagnet 367 is effective, when energized, to actuate a plunger 368 which engages the valve 356 in the chamber 361 to shift the valves 356 and 357, against the opposition of the spring 366, into seated and unseated positions, respectively, the valve 356 thus closing the communication between the chamber 358 and the atmospheric chamber 361 and the valve 357 opening the communication between the chamber 358 and the chamber 363.

One terminal of the electromagnet 367 is connected by a wire 371 to the contact finger 329 of the anti-wheel-sliding device 19, and the opposite terminal of the electromagnet 367 is connected to the grounded terminal of the battery 249 as by connection to ground by a wire 372. The contact finger 328 is connected by a wire 373 to the wire 248 which is connected to the non-grounded terminal of the battery 249. It will thus be seen that when the switch arm 324 of the anti-wheel-sliding device 19 is actuated into circuit-closing position connecting the contact fingers 328 and 329, the circuit is established for energizing the electromagnet 367 of the magnet valve device 20.

The vent valve device 22 comprises a casing 376 which is attached to the floor 92 of the vehicle or control car and which has a chamber 377 therein to which the pipe 98a is constantly connected. The chamber 377 contains a valve 378 which is normally yieldingly urged by a spring 380 into seated relation on an annular rib seat 379 to close a port 381 through which fluid under pressure in the chamber 377 may be exhausted to atmosphere. The valve 378 has a stem 382 which extends through the port 381 to the upper surface of the floor 92 and which is adapted to be engaged by a lug 383 on the under surface of the brake pedal 12 only when the brake pedal 12 is fully depressed. When the brake pedal 12 is fully depressed into the emergency position indicated, the valve 378 is unseated to exhaust fluid under pressure from the chamber 377 and accordingly from the pipe 98a and the safety control pipe 98.

The magnetic track shoe brake device 23 may comprise a shoe portion 386 which is adapted to engage the track rail 387, a magnetic core portion 388 and an electromagnet winding 389 mounted in insulated relation in associated relation with the magnet core 388.

Movement of the magnetic track brake shoe device 19 into and out of contact with the track rail 387 is effected in any suitable manner, as by means of a pressure cylinder 391 suitably mounted on or secured to a portion of the vehicle truck 392. The pressure cylinder 391 contains a piston 393 having a stem 394 on which the magnetic track brake shoe device 23 may be suspended by means of an inverted U-shaped bracket 395 pivotally connected centrally of the legs thereof to the outer end of the stem 394, the track brake shoe device 23 being secured to the outer end of the legs of the bracket 395. At one side of the piston 393 is a chamber 396 to which fluid under pressure is supplied and from which fluid under pressure is released under the control of the magnet valve device 24. A biasing spring 397 acting on the side of the piston opposite to the chamber 396 is effective when fluid under pressure is released from the chamber 396 to urge the piston 393 downwardly so that, assisted by gravity, the track brake shoe device 23 drops into contact with the track rail 387.

The magnet valve device 24 comprises a casing having a chamber 399 which is constantly connected to the chamber 396 of the pressure cylinder 391 by a pipe 401. Contained in the chamber 399 are a pair of oppositely seating valves 402 and 403. The valve 402 controls communication from the chamber 399 to a chamber 404 which is constantly connected to atmosphere through a port 405 and the valve 403 controls communication between the chamber 399 and a chamber 406 which is connected by the pipes 365 and 364 to the main reservoir pipe 49. A spring 407 contained in the chamber 406 and acting on the end of the fluted stem of the valve 403 normally yieldingly urges the valves 402 and 403 into seated and unseated positions respectively, the valve 402 closing the communication between the chamber 399 and the chamber 404 and the valve 403 opening the communication between the chamber 399 and the chamber 406 connected to the main reservoir pipe 49.

The magnet valve device 324 further comprises an electromagnet 409 which when energized actuates a plunger 410 to engage the end of the fluted stem of the valve 402 and shifts the valves 402 and 403 against the force of the spring 407 into unseated and seated positions respectively, wherein the valve 402 opens communication from the chamber 399 to the atmospheric chamber 404 and the valve 403 closes communication between the chamber 399 and the chamber 406.

It will thus be seen that normally, that is, when the electromagnet 409 of the magnet valve device 24 is deenergized, fluid under pressure is supplied under the control of the magnet valve device 24 to the chamber 396 of the pressure cylinder 391 to raise the track shoe brake device 23 out of contact with the track rail 387. It will also be apparent that when the electromagnet 409 of the magnet valve device 24 is energized, fluid under pressure is released from the pressure chamber 396 and the track brake shoe 23 accordingly falls into contact with the track rail 387.

Energization and deenergization of the electromagnet 389 of the magnetic track brake shoe device 23 and the electromagnet 409 of the magnet valve device 24 is effected under the control of the controller device 25 in the manner to be presently described.

Referring to Figs. 2 and 5, the controller device 25 comprises a casing 411 which is adapted to be mounted in any suitable manner and which may be attached to the self-lapping valve casing section 32 of the control valve mechanism 11. Contained within the casing 25 is a controller drum 412 of insulating material which may be mounted for rotation in the casing in any suitable manner, as on a shaft 413 journaled at its opposite ends to the casing 411 and having secured thereto a pinion gear 414. Inset in the surface of the drum is a stepped contact segment 415.

Associated with the controller drum 412 are a plurality of contact fingers 417 to 425 which are mounted in insulated relation on the casing 411 and arranged in spaced relation longitudinally of the drum 412 and suitably biased as by springs 426 into contact with the surface of the drum 412. As indicated in Fig. 5 and Fig. 2, the contact finger 417 is constantly connected to a source of electric current, such as a trolley wire 427, as by a wire 428 and the trolley pole 429.

The contact finger 418 is constantly connected to one terminal of the electromagnet 409 of the magnet valve device 24 as by wires 430 and 431, the opposite terminal of the electromagnet 409 being connected to ground by a wire 432.

The contact finger 419 is connected to one terminal of a resistor 434. The opposite terminal of the resistor 434 is connected by a wire 435 and a branch wire 433 to one terminal of the electromagnet 389 of the track shoe device 23, and the opposite terminal of electromagnet 389 is connected to ground by a wire 436.

The contact fingers 420, 421, 422, 423, 424 and 425 are connected to successive points along the resistor 434, the contact finger 425 being connected to the terminal of the resistor 434 to which the wire 435 is connected.

When the controller drum 412 is rotated in a counterclockwise direction, as viewed in Fig. 2, the contact segment 415 first connects the contact fingers 417, 418 and 419, thus establishing circuits for energizing the electromagnet 409 of the magnet valve device 24 and for energizing the electromagnet 389 of the track shoe brake device 23. As the controller drum 412 continues to rotate in a counterclockwise direction, the contact fingers 420, 421, 422, 423, 424 and 425 are successively engaged by the contact segment 415 to cause a successively increasing amount of the resistor 434 to be shunted and thus increasing in steps, correspondingly, the current supplied from the trolley wire 427 through the resistor 434 to the electromagnet 389 of the track brake device 23 to increase the excitation thereof and accordingly the degree of braking force effected thereby.

Rotation of the controller drum 412 is effected by means of a gear segment 438 which meshes with the pinion gear 414 on the shaft 413 of the controller drum 412, the gear segment 438 having a hub portion 437 suitably journaled for rotation on a shaft 79a which is suitably supported for rotation in the casing 411. The shaft 79a may be coupled directly to the shaft 79 of the self-lapping valve device 35, as indicated by the broken line 440 in Fig. 2, or may be connected in any suitable manner to rotate in accordance with the rotation of the shaft 79. Secured to the shaft 79a adjacent the hub 437 of gear segment 438 is an operating arm 439 which carries an adjusting screw 441 that is positioned in the plane of the gear segment 438 and which is adapted to engage the segment to move it in accordance with the rotation of the shaft 79a and arm 439. A coil spring 442 is secured at one end to a lug or pin 443 on the gear segment 438 and at the opposite end to a lug 444 on the casing 411 and thus normally yieldingly biases the gear segment 438 to rotate in a counterclockwise direction, as viewed in Fig. 2, to cause rotation of the controller drum 412 in a clockwise direction to the normal position shown, wherein the said contact segment 415 disengages all of the contact fingers 417 to 425. A projecting lug 446 on the gear segment 438 engages a stop lug 447 formed on the casing 411 to limit the rotation of the gear segment 438 in the counterclockwise direction and thus determine the normal position of the controller drum 412.

It will accordingly be apparent that since the shaft 79 of the self-lapping valve device 35 is operatively rotated by depressing the brake pedal 12 and since the shaft 79a of the controller is so connected to the shaft 79 as to rotate therewith, the depression of the brake pedal 12 causes simultaneous operation of the self-lapping valve device 35 and of the controller device 25, the self-lapping valve device 35 functioning to effect application of the fluid pressure brakes and the controller device 25 functioning to effect application of the magnetic track shoe brakes in the manner to be hereinafter described.

The pneumatic switch 26, as illustratively shown, may comprise a casing containing a piston 451 having a stem 452 carrying in insulated relation thereon a pair of spaced contact bridging members 453 and 454 for connecting, respectively, a pair of insulated stationary contact fingers 455 and a pair of contact fingers 456.

At one side of the piston 451 is a chamber 457 which is constantly connected to and charged with fluid under pressure from the safety control pipe 98 through a branch pipe 459. At the opposite side of the piston 451 is a chamber 461 containing a compression spring 462 which is interposed between the piston 451 and the casing so as to yieldingly urge the piston in the left hand direction, as viewed in Fig. 1, to cause the contact bridging members 453 and 454 to engage their respectively associated pairs of contact fingers 455 and 456 in circuit-closing relation. When chamber 461 is charged with fluid under pressure, the piston is shifted against the force of spring 462, to effect disengagement of the contact bridging members 453 and 454 from their respectively associated contact fingers 455 and 456.

One of the contact fingers 455 and one of the contact fingers 456 are connected together and to a source of current, such as the trolley wire 427, by a wire 463. The other of the contact fingers 455 has the wire 435 connected thereto and is thus connected by the branch wire 433 to one terminal of the electromagnet 389 on the track shoe device 23. The other of the contact fingers 456 is connected by the wire 431 to one terminal of the electromagnet 409 of magnet valve device 24.

It will thus be apparent that the pneumatic switch device 26 is effective, when the pressure in the safety control pipe 98 and thus in chamber 457 is reduced sufficiently, to complete circuits independently of the controller 25, for energizing the electromagnet 389 of the track shoe device 23 and for causing magnet valve device 24 to be actuated to release fluid under pressure from chamber 396 of the pressure cylinder 391 and thus cause the track shoe device 23 to be lowered into contact with the track rail 387.

It will be understood that the pneumatic switch device 26 is merely illustrative of any suitable circuit controlling device controlled by variations in pressure in the safety control pipe 98.

*Operation of equipment*

(a). *Charging of the equipment.*—With the equipment conditioned as shown in Figs. 1 and 2, the brake pedal 12 and the pedal 195 of the foot-valve device 14 being released and the handle 171 of the control valve device 13 being depressed, fluid under pressure is supplied from the main reservoir 9 to the safety control pipe 98 and the lock pipe 234 through the branch pipe 51 and main reservoir supply pipe 49, chamber 183 of the controller valve device 13 past the upper open valve seat of the valve 178, chamber 179, pipe 193, chamber 192 of the foot-valve device 14, past the unseated diaphragm valve 194, chamber 191 and pipe and passage 98a. The chamber 232 of the pressure cylinder 228 of the locking device 16 is supplied with fluid under pressure from the lock pipe 234 and piston 229 is accordingly actuated to disengage the pawl 225 from the toothed segment 224. Fluid under pressure is supplied from the safety control pipe to chamber 457 of pneumatic switch device 26, the piston chamber 96 of the emergency valve device 40 and piston chamber 281 of the retardation controller device 18. Since the brake pedal 12 is released, the self-lapping valve device 35 is conditioned as shown to connect the pressure chamber 44 to atmosphere, and the controller device 25 is positioned to interrupt the circuit for the magnet valve device 24 and for the electromagnet 389 of the track shoe brake device 23. Fluid under pressure is accordingly supplied from the main reservoir pipe 49, under the control of the magnet valve device 24, to the chamber 396 of the pressure cylinder 391 to raise the magnetic track brake shoe device 23 out of contact with the rail 387.

Since the switch arm 324 of the anti-wheel-sliding device is in open position, the magnet valve device 20 is effective to vent the chamber 351 of the control valve device 21 and thus the brake cylinder 10 is connected to the straight-air pipe 121 which is connected to the pressure chamber 44 of the self-lapping valve device 35 through passage 122, chamber 119 of the supply magnet valve device 115, bore 124, chamber 125, passage 111, cavity 107 in the slide valve 102 of the emergency valve device 40, and passage 109. Since the pressure chamber 44 is vented to atmosphere, the straight-air pipe 121 is thus also vented to atmosphere. Fluid under pressure is, accordingly, entirely released from the brake cylinder 10 and other brake cylinders, not shown, so that the fluid pressure brakes are released. Furthermore, with the pressure in the chamber 215 at atmospheric pressure due to the pressure in the straight-air pipe being at atmospheric pressure, the valve 216 of the cut-off valve device 15 is seated on its lower seat and unseated from its upper gasket seat 219 to vent the chamber 214 so that the diaphragm valve 209 is accordingly unseated to open the by-pass communication around the non-return valve 208 in the pipe 98a through pipe 206, chamber 202 of the cut-off valve device 15, port 205, chamber 203 and pipe 207.

(b). *Service application of the brakes.*—Assuming that the vehicle or train of cars is traveling along the road with the equipment conditioned as shown in Figs. 1 and 2, and that it is desired to effect a service application of the brakes, the operator first shifts the operating handle 171 of the controller valve device 13 to cut off the power to the propelling motors of the vehicle or cars and then depresses the brake pedal 12 into the service application zone.

The self-lapping valve device 35 and the controller device 25 are thus accordingly simultaneously operated. Operation of the self-lapping valve device 35 causes fluid under pressure to be supplied from the main reservoir 9 to the straight-air pipe 121 through the pressure chamber 44, passage 109, cavity 107 of the slide valve 102 of the emergency valve device 40, passage 111, chamber 125 of the supply magnet valve device 115, bore 124, chamber 119, and passage 122. Fluid under pressure is accordingly supplied to the brake cylinder 10 from the straight-air pipe 121 past the unseated valve 342 of the control valve device 21 and to the chamber 215 of the cut-off valve device 15.

Simultaneously with the initiation of the application of the fluid pressure brakes by the supply of fluid under pressure to the brake cylinder 10, the contact segment 415 on the controller drum 412 connects the contact fingers 417, 418, 419, to cause initial energization of the electromagnet 389 of the track brake shoe device 23 and the lowering of the track brake device 23 into contact with the rail 387 in the manner previously described.

By further depressing the brake pedal 12 into the service application zone, the pressure of fluid supplied to the straight-air pipe 121 and to the brake cylinder 10 is increased. Simultaneously, the rotation of the controller drum 412 successively shunts portions of the resistor 434 and thus causes an increase in the degree of excitation of the electromagnet 389 of the track brake device 23, whereby the degree of application of the magnetic track shoe brakes is increased.

A full service application of the brakes is obtained when the lug 383 on the underside of the brake pedal 12 just engages the stem 382 of the vent valve 22 without unseating the valve 378. Since the spring 380 holding the valve 378 of the vent valve 22 seated necessitates an additional increase in the force required to further depress the brake pedal 12, the operator is informed sensitively that he has reached the limit of the service application zone.

The pressure established in the pressure chamber 44 of the self-lapping valve device 35 is in proportion to the degree or the amount of movement of the brake pedal into the service application zone and as long as the rate of retardation of the vehicle or train of cars resulting from the simultaneous application of the magnetic track shoe brake 23 and the fluid pressure brake does not exceed the setting of the retardation controller 18 as determined by the manually operable adjusting device 267, the pressure in the straight-air pipe 121 and in the brake cylinder 10 corresponds to the pressure in the pressure chamber 44. However, if the rate of retardation of the vehicle exceeds the setting of the retardation controller 18 and the inertia body 242 is actuated to cause the movable contact member 245 carried by the inertia body to engage the contact finger 246, the circuit is completed for energizing the electromagnet 128 of the supply magnet valve device 115 to actuate the valve 118 to close off the connection between the pressure chamber 44 and the straight-air pipe 121, so that further increase in the pressure in the straight-air pipe is prevented.

When the rate of retardation of the vehicle further increases, due to the increase in the co-efficient of friction between the rubbing parts of the fluid pressure brake and also between the magnetic track shoe 23 and the rail 387 caused by reduction in speed of the vehicle, the inertia body 242 is swung further to the left so that the contact member 245 contacts the contact finger 247 as well as the contact finger 246. The electromagnet 142 of the release magnet valve device 116 is accordingly energized and the release valve 131 unseated to open communication from the straight-air pipe 121 to the exhaust port 113 of the emergency valve device 40 through passage 122, restricted passage 135 of the choke 134, passage 133, chamber 132 past the unseated valve 131, bore 138, chamber 139, passage 112, and cavity 108 in the slide valve 102.

The degree of brake cylinder pressure is accordingly reduced until the rate of retardation of the vehicle or train of cars due to the combined effect of the magnetic track shoe brakes and the fluid pressure brakes is insufficient to maintain the contact member 245 of the retardation controller device 15 in contact with the contact member 247, whereupon the circuit for energizing the electromagnet 142 of the release magnet valve device 116 is interrupted and the release valve 131 reseated to close off the communication, just described, through which fluid under pressure was exhausted to atmosphere from the straight-air pipe 121.

It will thus be apparent that the degree of application of the fluid pressure brake is automatically controlled by the retardation controller device 18 so as to supplement the braking effect caused or produced by the magnetic track shoe brake sufficiently to produce the rate of retardation as determined by the setting of the adjusting handle 271 of the adjusting device 267 and accordingly of the retardation controller 18.

If for any reason, as for example the temporary condition of the track rails, the braking force applying the brake shoes to the wheels on an individual axle is great enough that the wheels begin to slip, that is, decrease in speed of rotation from that corresponding to the speed of the vehicle toward zero speed corresponding to the locked position of the wheel, the anti-wheel sliding device 19 functions immediately to close the circuit for energizing the electromagnet 367 of the magnet valve device 20. The magnet valve device 20 is accordingly actuated to cause fluid under pressure to be immediately and rapidly supplied to the chamber 351 of the control valve device 21. The piston 348 of control valve device 21 is thus actuated to cause the connection from the straight-air pipe 121 to the brake cylinder 10 to be closed and to cause the brake cylinder 10 to be connected to the atmospheric chamber 344 to exhaust fluid under pressure therefrom.

The magnet valve device 20 is mounted close to the control valve device 21 so that the pipe 359 is of relatively short length, and the control valve device 21 is mounted close to the brake cylinder 10 so that the connecting pipe 341 therebetween is relatively short in length. Thus upon the energization of the magnet valve device 20 the control valve device 21 is substantially immediately operated to vent fluid under pressure from the brake cylinder 10 and reduce the degree of application of the fluid pressure brakes. In view of the fact that the anti-wheel-sliding device 19 responds quickly to the tendency of the wheels to slow up to a locked condition due to the application of excessive braking force thereon, the switch arm 324 is actuated to circuit-closing position to energize the magnet valve device 20 and thus effect release of fluid under pressure from the brake cylinder 10 while the wheels are slipping, that is reducing from train speed to zero speed, and before the vehicle wheel or wheels actually reach a locked condition.

Due to the rapid reduction in the pressure of the fluid in the brake cylinder 10 associated with the axle and wheel unit tending to approach a locked condition, the braking force of the fluid pressure brakes acting on the wheels and axle is rapidly reduced and thus the axle and wheel unit again returns towards the speed corresponding to the speed of travel of the vehicle. The switch arm 324 is held in circuit-closing position while the slipping wheels accelerate and is returned to the circuit-opening position when the slipping wheels again rotate at a speed corresponding substantially to train speed. When switch arm 324 returns to circuit-opening position, the magnet valve device 20 is deenergized to cause operation of the control valve device 21 to restore the connection of the brake cylinder 10 to the straight-air pipe 121 and cut off the connection from the brake cylinder 10 to atmosphere through the exhaust chamber 344 and port 345.

If the braking force applied to the axle and wheel unit by restoration of pressure in the brake cylinder 10 is still excessive, the operation is repeated, so that at no time are the individual wheels and axle units permitted to attain a locked position. Sliding of the wheels along the track rails on one spot on the wheel is thus prevented and, accordingly, the development of flat spots on the wheels is prevented.

It will be noted that the control valve device 21 is actuated to cut off the connection between the straight-air pipe 121 and the brake cylinder 10. Thus the pressure in other brake cylinders (not shown) as determined by the pressure in the straight-air pipe 121 is unaffected by the operation of the anti-wheel-sliding device 19 for the brake cylinder 10 shown. Since each brake cylinder is thus individually controlled by an anti-wheel-sliding device corresponding to the device 19 shown, it will be seen that the pressure in all brake cylinders is not necessarily simultaneously reduced upon the tendency of one wheel-and-axle unit to slide. Economy of fluid pressure consumption is thus obtained.

(c). *Release of the brakes following a service application.*—In order to effect the release of the brakes after effecting a service application thereof in the manner previously described, the operator merely relieves the pressure applied to the brake pedal 12 to permit it to return upwardly toward its normal raised position. The shaft 79 of the self-lapping valve device 35 and the shaft 79a of the controller device 25 are accordingly returned toward the normal position thereof, the self-lapping valve device 35 correspondingly functioning to reduce the pressure in the pressure chamber 44 and in the straight-air pipe 121 and the controller device 25 functioning to successively cut in portions of the resistor 434 to decrease the exciting current for the electromagnet 389 of the magnetic track shoe device 23.

Upon the complete release of pressure from the brake pedal 12, and its return to its normal raised position as shown in Fig. 1, the self-lapping valve 35 is conditioned to vent the pressure chamber 44 and the straight-air pipe 121 to atmosphere and the drum 412 of the controller device 25 is returned to the position shown in Fig. 5 wherein the circuits for energizing the magnet valve device 24 and the electromagnet 389 carried on the magnetic track brake shoe device 23 are interrupted. Since the brake cylinder 10 is connected to the straight-air pipe 121 past the unseated valve 342 of the control valve device 21, fluid under pressure is vented therefrom simultaneously with the venting of fluid under pressure from the straight-air pipe 121, and the fluid pressure brakes are thus completely released. Upon the deenergization of the magnet valve device 24, fluid under pressure is again supplied to the chamber 396 of the pressure cylinder 391 and the magnetic track shoe brake device 23 is accordingly raised out of contact with the track rails 387.

(d). *Manual emergency application of the brakes.*—If it is desired to effect an emergency application of the brakes manually, this may be accomplished by the full depression of the brake pedal 12 through the service application zone to the emergency position, which is the limit of movement of the brake pedal toward the floor 92. In the emergency position of the brake pedal 12, the valve 378 of the vent valve 22 is unseated and the pressure in the pipe 98a and in the safety control pipe 98 is reduced because the choke 180 in the controller valve device 13 restricts the flow of fluid under pressure from the main reservoir supply pipe 49 to the pipe 98a and the safety control pipe 98 to a rate which is less than the rate at which the fluid under pressure is vented past the unseated valve 378 of the vent valve device 22.

In the event that the pedal 195 of the foot-valve device 14 had been depressed and then raised with the controller handle 171 in its raised position, the choke 190 in the passage 188 of the foot-valve device 14 would function similarly to restrict the rate of flow of fluid under pressure from the main reservoir supply pipe 49 to the pipe 98a and the safety control pipe 98, so that the unseating of the valve 378 would effect the reduction in the pressure in the safety control pipe 98.

Upon the reduction in the pressure of the fluid in the safety control pipe 98 effected by operation of the brake pedal 12 in the manner just described, the piston 95 of the emergency valve device 40 is shifted by the higher main reservoir pressure in the valve chamber 99 downwardly from the normal position thereof into contact with a gasket seat 90 after first closing the feed groove 106 to close off the connection between the valve chamber 99 and the piston chamber 96. At the same time, reduction of pressure in chamber 457 of pneumatic switch device 26 and in the chamber 281 of the pressure cylinder 269 of the retardation controller device 18 is effected by the reduction in the pressure in the safety control pipe 98. As a result, the pneumatic switch device 26 is actuated to circuit-closing position to effect application of the magnetic track shoe device 23 to maximum degree and the piston 268 of retardation controller device 18 is shifted by the force of the spring 282 outwardly of the pressure cylinder 269 to cause the lever arm 277 to actuate the piston 256 to increase the tension on the spring 255 to the maximum extent.

At the same time also, the reduction in the safety control pipe pressure causes a reduction in the pressure in the lock pipe 234 and a consequent actuation of the pawl 225 of the locking device 16 into engagement with the toothed surface on the segment 224, fluid under pressure being vented from the lock pipe 234, in parallel through the cut-off valve device 15 and the non-return valve 208, to atmosphere past the unseated valve 378 of the vent valve 22.

The actuation of the pawl 225 into engagement with the toothed segment 224 is without effect at this time, except to prevent the return of the brake pedal 12 to its normal raised position, as will be described and explained hereinafter.

Upon the shifting of the piston 95 of the emergency valve device 40 to application position, the slide valve 102 is likewise shifted to application position wherein the port 110 in the slide valve 102 registers with the passage 111 and the passage 153 is uncovered, the exhaust port and passage 113 and the passage 109 and 112 being lapped or closed at the seat of the slide valve 102. Fluid under pressure is accordingly supplied from the main reservoir 9 to the straight-air pipe 121 through branch pipe 51, main reservoir supply pipe and passage 49, passage 101, and valve chamber 99 of the emergency valve device, whence it flows through two parallel paths, the one being through the passage 153, chamber 151 of the inshot valve device 148, past the unseated ball valve 149, and through the passage 156, and the other path being through the port 110 in the slide valve 102, passage 111, chamber 127 of the supply magnet valve device 113, bore 124, past the unseated supply valve 118, chamber 119, and passage 122.

In the same manner as previously described for a service application of the brakes, the controller device 25 is operated simultaneously with the operation of the self-lapping valve device 35 by operation of the brake pedal 12, but in view of the fact that the pneumatic switch device 26 has operated, as previously described, to cause the magnetic track shoe brake device 23 to be lowered into contact with the track rail and to cause the electromagnet 389 of the track shoe brake device to be energized, the operation of the controller 25 is without effect except to establish circuits in parallel with those established by the pneumatic switch device 26.

When the pressure of the fluid supplied from the main reservoir 9 to the straight-air pipe 121 and brake cylinder 10 is sufficient to overcome the tension of the spring 159 of the inshot valve device 148, the piston 154 is shifted downwardly and, with the consequent lowering of the stem 155 on the piston 154, the ball valve 149 is seated to cut off the further supply of fluid under pressure to the straight-air pipe 121 and to the brake cylinder 10 through the path controlled by the inshot valve device. Fluid under pressure continues to flow to the straight-air pipe and the brake cylinder 10 through the other parallel path, under the control of the supply magnet valve device 115, as long as the retardation controller device 18 is not operated to effect energization of the electromagnet 128 of the magnet valve device 115 and the consequent seating of the supply valve 118 to close the communication to the straight-air pipe.

The purpose of the inshot valve device 148 is thus to insure a build up of pressure in the straight-air pipe 121 and in the brake cylinder which is adequate to produce sufficient braking force on the vehicle wheels to bring the car or train of cars to a stop yet which will not cause sliding of the wheels. Obviously, but for the provision of the communication from the main reservoir to the straight-air pipe which is controlled by the inshot valve device 248, the accidental sticking of the supply valve 118 in closed position, such as might be caused due to breaking of the biasing spring 126 which acts to unseat the valve 118, operation of the emergency valve device 40 would otherwise be ineffective to produce an application of the brakes. By thus providing two parallel communications, under the control of the emergency valve device 40, through which fluid under pressure is supplied to the straight-air pipe, and by providing the inshot valve device 148 to prevent the excessive build up of pressure in the straight-air pipe in the event that fluid under pressure is supplied to the straight air pipe through only the communication controlled by the inshot valve device due to accidental sticking of the supply valve 118 of supply magnet valve device 115 in closed position, application of the brakes by operation of the emergency valve device 40 in a safe manner without excessive braking force or shock to the cars is assured.

Assuming that the supply magnet valve device 115 is in good condition and functions properly, the retardation controller device 18 is effective during emergency applications of the brakes to cause, first, closing of the supply valve 118 and then, as the speed of the car or train decreases, unseating of the release valve 131 of the release magnet valve device 116. In view of the fact that the pressure in the chamber 281 of pressure cylinder 269 has been reduced by reduction in the pressure of the safety control pipe 98, the retardation controller device 18 is set so as to produce a maximum rate of retardation. Consequently, since the tension on the spring 255 of the retardation controller 18 has been increased to the maximum degree, the contact member 245 carried by the inertia body 242 of the retardation controller device 18 is not swung into contact with the contact finger 246 until the pressure built up in the straight-air pipe 121 and the brake cylinder 10 produces sufficiently high braking force to overcome the increased degree of tensioning of the spring 255.

It will be apparent that since the tension of the spring 264 of the retardation controller device remains constant and is not effected by reduction in pressure in the chamber 281 of the pressure cylinder 269, the amount of the difference in braking force required to cause contact of the contact member 245 only with the contact finger 246 and that required to cause contact also with the contact finger 247 is a constant value, and accordingly that the pressure in the straight-air pipe 121, as controlled by the retardation controller device 18, corresponds substantially to the degree of tensioning of the spring 255.

It will also be apparent that due to the fact that the slide valve 102 of the emergency valve device 40, when in application position, laps or closes the exhaust port and passage 113 and thereby cuts off the communication from the passage 112 to atmosphere through the exhaust port 113, the release of fluid under pressure from the straight-air pipe 121 and brake cylinder 10 to the passage 112 past the unseated release valve 131 of the release magnet valve device 16 under the control of the retardation controller device 18 is ineffective to cause reduction in the pressure in the straight-air pipe 121 and brake cylinder 10 to a degree lower than the pressure setting of the safety valve device 145. The safety valve device 145 is effective to permit release of fluid under pressure from the passage 112 only so long as the pressure of the fluid released from the straight-air pipe 121 to the passage 112 exceeds a certain pressure, this pressure being somewhat higher than the pressure required to seat the ball valve 149 of the inshot valve device 148.

The minimum pressure to which the pressure in the straight-air pipe 121 and brake cylinder 10 may be reduced in emergency applications of the brakes by operation of the retardation controller 18 is accordingly determined by the pressure setting of the safety valve device 145. It should be understood that this minimum pressure is sufficiently high to insure the maintenance of an adequate braking force which will, however, not cause sliding of the wheels at the lower speeds of the car or train, under ordinary wheel and rail conditions.

In the event, however, that individual axles or wheels should begin to slip, that is reduce in speed toward a locked condition, the anti-wheel-sliding device 19, for each brake cylinder, operates in the manner previously described for a service application of the brakes to relieve brake cylinder pressure, and accordingly the braking force, to prevent sliding of the wheels.

It will be observed that, if for any reason, such as sticking of the piston 95 of the emergency valve device 40 in release position, the reduction in safety control pipe pressure by operation of the brake pedal 12 is ineffective to actuate the emergency valve device 40 to application position in the manner previously described, the self-lapping valve device 35 functions to supply fluid under pressure to the straight-air pipe 121 and thus to the brake cylinders in the same manner as for a service application of the brakes, except that the pressure attained in the straight-air pipe and brake cylinder will be higher, possibly even a maximum degree. As previously stated, with the brake pedal 12 in emergency position, the supply valve 37 of the self-lapping valve device 35 is held open and thus the maximum pressure of the fluid built up in the straight-air pipe may correspond to the maximum suppliable from the main reservoir 9, depending upon the control exercised by the retardation controller 18.

(e) *Release of the brakes following manual emergency applications.*—When it is desired to release the brakes following manual emergency applications of the brakes, the operator merely relieves the pressure on the brake pedal 12, as by removing his foot therefrom. Since the lock pipe 234 has been reduced in pressure and the locking pawl 225 accordingly rocked into interlocking engagement with the segment 224, the brake pedal 12 cannot be returned toward its raised position by action of the spring 84 of the self-lapping valve device 35. However, upon the release of the foot-applied pressure on the brake pedal 12, the spring 380 acting on the valve 378 of the vent valve device 28 is effective to seat the valve 378 and thus close off the communication through which fluid under pressure is vented from the safety control pipe 98. Obviously, the spring 380 may shift the brake pedal 12 and accordingly the bell-crank lever 88, independently of the self-lapping valve 35 being locked in position, for the reason that the cable 87 is flexible. If a rigid tie rod is provided instead of a flexible cable 87, the eyelet or clevis 86 must have a lost motion connection to the operating arm 83 of the self-lapping valve device 35.

With the valve 378 of the vent valve device 22 seated, the safety control pipe 98 is again charged with fluid under pressure from the main reservoir pipe 49 by way of the controller valve device 13, the foot-valve device 14 and the non-return valve 208 in the manner previously described. As the safety control pipe pressure is restored, the pressure in the lock pipe 234, chamber 457 of the pneumatic switch device 26, the piston chamber 96 of the emergency valve device, and the chamber 281 of the pressure cylinder 269, associated with the retardation controller device 18 is also restored. Accordingly, the emergency valve device 40 is again conditioned in the normal position shown in Fig. 2, as is also the piston 268 associated with the retardation controller device 18. Upon the restoration of pressure in the lock pipe 234, the pawl 225 is shifted out of interlocking engagement with the toothed segment 224 and the spring 84 then becomes effective to return the self-lapping valve device 35, the controlled 25, and the brake pedal 12 to release position. Fluid under pressure is accordingly released from the brake cylinder 10, under the control of the self-lapping valve device 35, and raising of the track shoe device 23 out of contact with the rail 387 and deenergization of the electromagnet 389 of the track brake device 23 effected in the manner previously described, under the control of controller 25.

It will be observed that the actuation of pneumatic switch device 26 to circuit-opening position by the increase in safety control pipe pressure is ineffective, alone, to release the magnetic track shoe brakes because the controller device 25 is in parallel therewith and until the controller device 25 is returned to release position as described above, the magnetic track shoe brakes will not be released. The operation of the magnetic track shoe brakes as described assumes ability of the electromagnet 389 on the track shoes to withstand continued excitation.

If the electromagnets 389 are not capable of withstanding a continuous excitation, then suitable devices must be provided to interrupt the circuits for the electromagnet 389 and magnet 409 of magnet valve device 24 independently of pneumatic switch device 26 and controller 25, so that the magnetic track brakes are released before the electromagnets 389 are destroyed by overheating.

(*f*). *Deadman's emergency application of the brakes.*—Assuming the vehicle or train of cars to be traveling along the road with the equipment conditioned as shown in Figs. 1 and 2, wherein the brake pedal 12 is in its normal raised position, the pedal 195 of the foot-valve device 14 is released, and the handle 171 of the controller valve device 13 is depressed, a deadman's emergency application of the brakes may be effected by releasing the handle 171 of the controller valve device 13. Upon the release of the handle 171 of the controller valve device 13, the valve 178 is shifted to its upper seated position to cut off the supply of fluid under pressure from the main reservoir pipe 49 and is unseated from its lower valve seat to establish connection from the safety control pipe 98 to atmosphere by way of the pipe 98*a*, branch pipe 207, chamber 203 of cut-off valve device 15, port 205, chamber 202, branch pipe 206, pipe 98*a*, chamber 191 of the foot-valve device 14, past the unseated diaphragm valve 194, chamber 192, pipe 193, chamber 179 of the controller valve device 13, past the open lower valve seat of the valve 178 and exhaust port and passage 182. Accordingly, in the same manner as for a manual emergency application of the brakes, reduction of fluid pressure in the safety control pipe 98 results in a reduction of fluid pressure in the piston chamber 96 of the emergency valve device, chamber 457 of pneumatic switch device 26, piston chamber 281 of the pressure cylinder 269 associated with the retardation controller device 18, and the lock pipe 234. As a result, the retardation controller device 18 is automatically set to regulate to the maximum rate of retardation, the emergency valve device is operated in the manner previously described to supply fluid under pressure from the main reservoir 9 to the straight-air pipe 121 and the brake cylinder 10, and the pneumatic switch device causes application of the magnetic track shoe brakes. At the same time also, the reduction in pressure in the lock pipe 234 causes the pawl 225 of locking device 16 to be shifted into interlocking engagement with the toothed surface of the segment 224. In view of the fact that the controller device 25 is operated only when the brake pedal 12 is depressed, it will be apparent that, for a deadman's emergency application of the brakes, operation of the controller 25 out of its release position is not effected, but that application of the magnetic track shoe brake device 23 is nevertheless effected due to operation of the pneumatic switch device 26.

Accordingly for a deadman's emergency application of the brakes, application of the fluid pressure brakes associated with the vehicle wheels and of the magnetic track shoe brakes is automatically effected, the retardation controller device 18 functioning to regulate the pressure in the straight-air pipe 121 and accordingly in the brake cylinder 10 to prevent under ordinary conditions the application of the brakes with such excessive force while the car or train is reducing in speed under the application, as to cause sliding of the wheels.

It will be observed that the pressure of the fluid in the straight-air pipe becomes effective in the chamber 215 of the cut-off valve device 15 to unseat the valve 216 and thus acts in the chamber 214 on the diaphragm 213 to actuate the diaphragm valve 209 to seated position to close off the communication through the cut-off valve device 15 through which fluid under pressure is exhausted from the safety control pipe 98 to atmosphere. Such operation of the cut-off valve device 15 is not effected, however, until after the safety control pipe pressure has been reduced sufficiently to effect the emergency application of the brakes.

It will be apparent that the non-return valve 208 prevents the back-flow of fluid under pressure from the safety control pipe 98, in by-pass relation to the cut-off valve device 15, and consequently that when the cut-off valve device 15 is closed, further reduction in the safety control pipe pressure is prevented.

(*g*). *Suppression of deadman's emergency application.*—If the operator desires to release the handle 171 of the controller valve device 13 and the pedal 195 of the foot-valve device 14 at the same time, without causing a deadman's emergency application of the brakes, he may do so by first depressing the brake pedal 12 a sufficient degree into the service application zone to produce a sufficient degree of pressure in the straight-air pipe and accordingly in the brake cylinder 10 to actuate the cut-off valve device 15 to closed position. Thus, although a portion of the pipe 98*a* on one side of the cut-off valve device 15 and of the non-return valve 208 is thereafter vented to atmosphere through the exhaust port 182 of the controller valve device 13, the portion of the pipe 98*a* on the other side of the cut-off valve device 15 and of the non-return device 208 to which the safety control pipe 98 is connected is not so vented because the cut-off valve device 15 is closed and the non-return valve 208 prevents back-flow of fluid under pressure therepast.

It will be observed that the lock pipe 234 is, however, connected to that portion of the pipe 98a which is vented by simultaneous release of the handle 171 of the controller valve device 13 and the pedal 195 of the foot-valve device 14 and, accordingly, the pressure in the lock pipe 234 is reduced and the pawl 225 of the locking device 16 shifted into interlocking engagement with the toothed surface of the segment 224.

The self-lapping valve device 35 is thus locked against return to release position by the locking device 16 and consequently the pressure supplied to the straight-air pipe and the brake cylinder 10 is maintained effective in the cut-off valve device 15 to maintain the diaphragm valve 209 thereof seated.

It will thus be seen that if the operator first effects at least a certain degree of service application of the brakes by depressing the brake pedal 12, he may then release both the handle of the controller valve device 13 and the pedal of foot-valve device 14 without effecting a deadman's emergency application of the brakes. Furthermore, since the locking device prevents return of the self-lapping valve device to release position, it also prevents return of the brake pedal 12 to release position, and thus the operator may in addition relieve the pressure on the brake pedal 12 and even remove his foot entirely from the brake pedal without effecting release of the brakes.

It will be apparent that with the self-lapping valve device 35 locked in a service application position in the manner just described, an emergency application of the brakes may be effected immediately, without the necessity of returning the self-lapping valve device 35 to release position, by merely further depressing the brake pedal 12 to emergency position to unseat the valve 378 of the vent valve device 22. As previously stated, the pawl 225 of the locking device 16 is effective, when in interlocking engagement with toothed surface of the segment 224, to prevent return of the self-lapping valve device 35 to release position but is ineffective to prevent further depression of the brake pedal 12. Upon the unseating of the valve 378 of the vent valve 22, the safety control pipe 98 is vented and an emergency application of the brakes effected in the manner previously described.

My invention, therefore, makes use of the psychological principle that the tendency of the operator is to further depress the brake pedal when a higher degree of braking or retardation is required.

Summary

Summarizing, it will be seen that I have provided a safety car equipment comprising fluid pressure brake apparatus, magnetic track shoe brake apparatus, a self-lapping valve device which is manually operable, as by a brake pedal, to effect service applications of the fluid pressure brake apparatus by straight-air operation, and a controller device operated simultaneously with the self-lapping valve device, by the brake pedal, for controlling the raising and lowering of the magnetic track brake shoe devices and the energization of the electromagnet on the magnetic track brake shoes.

A supply magnet valve and a release magnet valve, which are controlled by a retardation controller of the inertia type, are provided to regulate pressure in the straight-air pipe and thus in the brake cylinders on all cars, according to the setting of the retardation controller. A manually operable device is provided for setting and adjusting the retardation controller to regulate the rate of retardation to any desired rate over a certain range, between a maximum and a minimum limit.

An anti-wheel-sliding device of the fly-wheel type is provided for rapidly releasing the pressure for each individual brake cylinder upon the tendency to slip of the wheel and axle unit with which the brake shoes operated by the brake cylinder are associated. The anti-wheel sliding device functions rapidly enough during the interval of the time in which the wheels and axle are reducing in speed from the speed corresponding to the speed of travel of the vehicle, to zero speed corresponding to locked position, that the pressure in the brake cylinder is relieved and the wheel and axle unit thereby permitted to reaccelerate toward the normal speed corresponding to the speed of travel of the vehicle before the wheels attain a locked condition. A pneumatically operated control valve device, controlled by the anti-wheel-sliding device through a magnet valve device, functions to cut off the individual brake cylinder from the straight-air pipe and to release fluid under pressure from the individual brake cylinder to atmosphere, when a wheel and axle unit, with which the anti-wheel-sliding device is associated, begins to slip.

An emergency valve device, operated upon a reduction in the pressure in a so-called safety control pipe, is effective to cause the supply of fluid under pressure to the straight-air pipe to effect an emergency application of the brakes, through two parallel communications one of which is under the control of the supply magnet valve controlled by the retardation controller and the other of which is under the control of an inshot valve device.

The inshot valve device is effective to cut off the supply of fluid under pressure through the communication controlled thereby only when a predetermined pressure is built up in the straight-air pipe, for the purpose of insuring at least sufficient pressure in the straight-air pipe and in the brake cylinders upon an emergency application of the brakes to bring the car or train to a safe stop, notwithstanding a possible accidental failure of the supply magnet valve to open the communication controlled thereby.

The retardation controller is automatically adjusted to regulate the pressure in the straight-air pipe and in the brake cylinders to produce the maximum rate of retardation, upon the reduction in pressure in the safety control pipe.

A safety valve device is rendered effective by operation of the emergency valve device to application position for limiting the reduction in straight-air pipe and brake cylinder pressure caused by the retardation controller, to a certain minimum pressure.

A pneumatic switch device is actuated upon a reduction in safety control pipe pressure to effect application of the magnetic track shoe brakes to a maximum degree, independently of the controller device.

A hand operated controller valve device and a foot valve device, familiarly known as "deadman control devices" are provided for effecting a reduction in pressure in the safety control pipe when the operating handle of the controller and the pedal of the foot-valve are simultaneously released.

A cut-off valve device is operated, responsively to a build up of at least a certain predetermined pressure in the straight-air pipe and accordingly in the brake cylinders, to close the communication through which the hand operated controller and foot-valve device may effect reduction in the safety control pipe pressure. Thus, by first effecting a certain degree of application of the brakes so as to cause the cut-off valve to operate to closed position, the hand controller and the foot-valve may be simultaneously released without a "deadman" emergency application of the brakes being effected.

A pawl and ratchet device is automatically operated, by venting of a portion of the safety control pipe which is always vented by operation of the "deadman" devices, to lock the self-lapping valve device against return toward release position. Accordingly, if the cut-off valve device is first closed by depressing the brake pedal, the brake pedal, as well as the deadman devices, may be released entirely without effecting an emergency application of the brakes or a release of the brakes, the brakes being held applied to a degree determined by the amount the brake pedal was first depressed.

One of the features of my invention is the provision of a vent valve in the safety control pipe, which is operated to venting position only when the brake pedal is fully depressed to an emergency position beyond the extremity of the service application zone. Thus, notwithstanding that the cut-off valve device is operated to closed position to suppress a "deadman" emergency application of the brakes, an emergency application of the brakes may be effected merely by further depressing the brake pedal to emergency position.

It will be understood that various omissions, additions or modifications may be made in the embodiment of my invention as shown in the drawings without departing from the spirit of my invention and it is, therefore, not my intention to limit the scope of my invention except as it is necessitated by the scope of the prior art.

Having now described my invention, what I claim as new and desire to secure by Letters Patent, is:

1. In a safety car brake equipment, fluid pressure brake apparatus, electric brake aparatus, a self-lapping valve device operative to control application and release of the fluid pressure brakes, a controller device operative to control application and release of the electric brakes, a manually operative element for effecting simultaneous operation of the valve device and of the controller device, a pipe normally charged with fluid under pressure, an emergency valve device operative to an application position in response to a reduction of pressure in said pipe to effect an emergency application of the fluid pressure brakes, means operative in response to a reduction of pressure in said pipe to effect application of the electric brakes independently of said controller device, and a valve operative to effect reduction of pressure in said pipe, said valve being operated by said manually operative element only upon a certain predetermined degree of movement of the element out of its normal position.

2. In a vehicle brake equipment, a self-lapping valve device having a rotary operating shaft, yielding means urging said shaft into a normal release position, manually operative means for rotarily moving said shaft out of its normal position to effect operation of the valve device, said valve device being effective upon operation, to cause fluid under pressure to be supplied to produce application of the brakes to a degree in accordance with the degree of rotary movement of said shaft out of its normal position, a pipe normally charged with fluid under pressure, a toothed segment secured to said shaft, a pawl, and means responsive to a reduction of pressure in said pipe for effecting actuation of the pawl into interlocking engagement with the toothed segment to prevent return movement of said shaft by said yielding means toward its normal brake release position from an application position and thereby to maintain an application of the brakes.

3. In a vehicle brake equipment, a self-lapping valve device having a rotary operating shaft, yielding means urging said shaft into a normal release position, manually operative means for rotarily moving said shaft out of its normal position to effect operation of the valve device, said valve device being effective upon operation, to cause fluid under pressure to be supplied to produce application of the brakes to a degree in accordance with the degree of rotary movement of said shaft out of its normal position, a pipe normally charged with fluid under pressure, a toothed segment secured to said shaft, a pawl, and means responsive to a reduction of pressure in said pipe for effecting actuation of the pawl into interlocking engagement with the toothed segment to prevent return movement of said shaft by said yielding means toward its normal brake release position from an application position and thereby to maintain an application of the brakes, said segment and said pawl cooperating in such manner as to be ineffective to prevent further rotary movement of the said shaft away from its normal position to operate the valve device to increase the degree of brake application.

4. In a vehicle brake equipment, an electric brake device, a fluid pressure brake device, a manually operative brake control element, means operated by the said element for controlling the supply of fluid under pressure to and the release of fluid under pressure from the said fluid pressure brake device whereby to control application and release of the fluid pressure brakes, means operated simultaneously with said last means by the said element for controlling the application and release of the electric brake device, a pipe normally charged with fluid under pressure, and means operated in response to a reduction of pressure in said pipe for preventing operation of the said fluid pressure brake control means and of the electric brake control means by said element to effect release of the fluid pressure brakes and of the electric brakes.

5. In a train brake equipment, comprising a plurality of separate wheel brake units, means manually operative to effect application and release of all the brake units, an inertia device responsive to rate of change of speed of the train for so controlling all the brake units as to regulate the rate of retardation of the train to a selected rate, and means for each brake unit responsive only to a change in rotative speed of the wheels, with which the brake units are associated, at a rate exceeding a certain predetermined rate occasioned by the inception of wheel slipping for effecting a rapid reduction in the braking force with which the brakes of the corresponding braking unit are applied to prevent sliding of the wheels associated with that unit.

6. In a train brake equipment, in combination, a brake cylinder effective upon the supply of fluid under pressure thereto to cause application of the brakes on an associated car wheel and upon the release of fluid under pressure therefrom to effect release of the brakes, a pipe, valve means normally establishing communication between said brake cylinder and said pipe, means for causing fluid under pressure to be supplied to said pipe and brake cylinder to effect application of the brakes and for releasing fluid under pressure from said pipe and brake cylinder to effect release of the brakes, an inertia device responsive to rate of change of speed of the train for so controlling the pressure in said pipe and accordingly in said brake cylinder as to regulate the rate of retardation of the train to a selected rate, and means responsive only to a change in rotative speed of the car wheel, on which the brake cylinder causes application of the brakes, at a rate exceeding a certain predetermined rate occasioned by the inception of slipping of the wheel, for effecting operation of said valve means to cut off said brake cylinder from said pipe and rapidly release fluid under pressure from the said brake cylinder to reduce the degree of the brake application and thus prevent sliding of the vehicle wheels.

7. In a safety car brake equipment, in combination, a control pipe normally charged with fluid under pressure, means operable upon a reduction in fluid pressure in said pipe for effecting an application of the brakes, valve means for venting fluid under pressure from said pipe, a valve mechanism operable manually for effecting an application of the brakes, manually operable means adapted upon movement from release position over a certain range for effecting operation of said valve mechanism and upon a further movement for operating said valve means, means operable upon a reduction in pressure in said pipe for locking said valve mechanism against movement toward release position, said manually operable means having a movement relative to said valve mechanism from the position in which said valve means is open to permit closure of said valve means.

8. In a safety car brake equipment, in combination, a control pipe normally charged with fluid under pressure, means operable upon a reduction in fluid pressure in said pipe for effecting an application of the brakes, valve means for venting fluid under pressure from said pipe, a valve mechanism operable manually for effecting an application of the brakes, manually operable means adapted upon movement from release position over a certain range for effecting operation of said valve mechanism and upon a further movement for operating said valve means, means operable upon a reduction in pressure in said pipe for locking said valve mechanism against movement toward release position, said manually operable means being returnable at any time toward its normal release position, from the position in which said valve means is open, to permit closure of said valve means, notwithstanding that said locking means prevents return of said valve mechanism toward release position.

ELLIS E. HEWITT.